United States Patent
Kumar et al.

(10) Patent No.: US 12,481,567 B2
(45) Date of Patent: Nov. 25, 2025

(54) SYSTEM AND METHOD OF PROVIDING SYSTEM AVAILABILITY BY PREVENTING SOFTWARE CRASH DUE TO RECOVERY FAILURE

(71) Applicant: Oracle International Corporation, Redwood Shores, CA (US)

(72) Inventors: Kishy Kumar, Santa Clara, CA (US); Ajay Paddayuru Shreepathi, San Jose, CA (US); Ajit Mylavarapu, Mountain View, CA (US); Silvio Martinez, Capitola, CA (US); Guttu Sai Abhishek, Vizianagaram (IN)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 18/115,673

(22) Filed: Feb. 28, 2023

(65) Prior Publication Data
US 2024/0289238 A1     Aug. 29, 2024

(51) Int. Cl.
*G06F 16/00* (2019.01)
*G06F 11/14* (2006.01)
*G06F 16/23* (2019.01)

(52) U.S. Cl.
CPC ...... *G06F 11/1474* (2013.01); *G06F 16/2379* (2019.01); *G06F 2201/80* (2013.01)

(58) Field of Classification Search
CPC ............ G06F 16/2379; G06F 11/1474; G06F 2201/80
USPC ........................................................ 707/686
See application file for complete search history.

(56) References Cited

U.S. PATENT DOCUMENTS

| | | | |
|---|---|---|---|
| 6,148,417 A * | 11/2000 | da Silva | G06F 11/263 |
| | | | 714/E11.026 |
| 6,640,326 B1 | 10/2003 | Buckingham et al. | |
| 6,823,507 B1 | 11/2004 | Srinivasan et al. | |
| 7,269,759 B2 | 9/2007 | Biles | |
| 7,562,208 B1 | 7/2009 | Reed et al. | |
| 7,770,079 B2 | 8/2010 | Radke et al. | |
| 8,307,435 B1 | 11/2012 | Mann et al. | |
| 8,510,596 B1 | 8/2013 | Gupta et al. | |
| 8,713,385 B2 | 4/2014 | Radke et al. | |
| 9,389,973 B2 | 7/2016 | Jones et al. | |
| 9,455,038 B2 | 9/2016 | Tuers et al. | |
| 9,720,764 B2 | 8/2017 | Billeci et al. | |
| 10,241,856 B2 | 3/2019 | Giloni et al. | |
| 2006/0259518 A1 * | 11/2006 | Lomet | G06F 11/1474 |
| | | | 714/E11.131 |
| 2007/0136385 A1 | 6/2007 | Abrashkevich et al. | |

(Continued)

OTHER PUBLICATIONS

Non-Final Office Action for U.S. Appl. No. 15/261,688 dated Jun. 1, 2018.

(Continued)

*Primary Examiner* — Bai D Vu
(74) *Attorney, Agent, or Firm* — Vista IP Law Group, LLP

(57) ABSTRACT

Disclosed is an improved approach to handle recovery failures associated with fatal recovery processes. A software crash is prevented when a program has a failure that would typically crash the software, involving analyzing the failure in an operation, accumulating the failure information, clearing the failure (hence preventing the immediate crash), and not performing the desired operation until the root cause of the failure is fixed.

21 Claims, 21 Drawing Sheets

(56) References Cited

U.S. PATENT DOCUMENTS

| | | |
|---|---|---|
| 2008/0022160 A1 | 1/2008 | Chakraborty |
| 2009/0238474 A1 | 9/2009 | Sandberg |
| 2010/0185688 A1 | 7/2010 | Malinowski et al. |
| 2011/0022801 A1 | 1/2011 | Flynn |
| 2012/0011588 A1 | 1/2012 | Milener et al. |
| 2012/0072776 A1* | 3/2012 | Ng .................. G06F 11/3688 714/38.12 |
| 2012/0198174 A1 | 8/2012 | Nellans et al. |
| 2022/0083397 A1* | 3/2022 | Moser .................. G06F 9/5083 |
| 2023/0077289 A1* | 3/2023 | Sloane ............ G06F 16/24578 |

OTHER PUBLICATIONS

Notice of Allowance for U.S. Appl. No. 15/261,688 dated Nov. 15, 2018.

* cited by examiner

SYSTEM AND METHOD OF PROVIDING SYSTEM AVAILABILITY BY PREVENTING SOFTWARE CRASH DUE TO RECOVERY FAILURE

BACKGROUND

A database is an organized collection of structured information, or data, typically stored electronically in a computer system. A database is usually controlled by a database management system (DBMS), which is the management infrastructure that is used to control and operate upon the database. Data within the most common types of databases in operation today is typically modeled in rows and columns in a series of tables to make processing and data querying efficient. The data can then be easily accessed, managed, modified, updated, controlled, and organized. Most databases use structured query language (SQL) for writing and querying data.

Various types of logs are normally maintained within database systems. For example, a "redo log" is maintained in many database systems to hold redo records that allow persistence and restoration of activities within a database system for transactional activities. An "undo log" may include records that are used to roll back changes for uncommitted transactions. Both are employed to ensure atomicity and durability of transactions in the database.

In many database systems, "write-ahead logging" is a type of technique that is used in the database. With write-ahead logging, modifications are written to a log before they are applied to a database. Prior to the commit of a transaction, the database must therefore make sure that the log entries are made persistent prior to the commit. This requirement to make the logs persistent allows the changes made by the committed transaction to be recoverable in the event of a failure or disaster. This is because, if not made persistent, then the unavailability of the log records after a disaster may result in the inability to re-create the correct state of the database and thus result in inconsistent and possibly erroneous states within the data maintained by the database.

It is therefore important to understand that a recovery process must be performed if a failure occurs prior to the commit of a transaction. This is because the intermediate changes made by that transaction are not supposed to be made permanent in the database until and unless that transaction has committed. Database recovery is performed to restore the database to a correct and consistent state in the event of a failure so that, among other tasks, the intermediate changes made by the transaction can be removed. Often, the recovery process is performed by applying redo records to restore the database to a given state from prior to the failure. However, since the redo log records may actually make too many changes that encompass uncommitted changes to the data, then undo log records may subsequently need to be applied to roll back any of the uncommitted changes.

The circumstance addressed by this disclosure is the possibility that a failure may occur during the recovery process itself, which would thereby prevent the uncommitted states of one or more transactions from being corrected in the database. Conventionally, database systems are unable to tolerate such failures during the recovery process and would therefore cause the entire database system, or at least the affected database instance, to be shut down upon occurrence of the recovery failure. However, the problem with this approach is that in some circumstances, shutting down the database becomes an overly severe and draconian action that creates real-world performance, availability, and operational problems for users that must rely upon the database system.

Therefore, there is a need for an improved approach to implement a solution that addresses failures during the recovery process.

SUMMARY

Some embodiments are directed to an improved approach to handle recovery failures associated with fatal recovery processes, where some embodiments prevent a software crash when a program has a failure that would typically crash the software. Transaction quarantine is implemented that isolates a dead transaction whose recovery had failed such that the recovery of this transaction can be postponed until the root cause of the failure is fixed.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments of the invention are directed to a mechanism that prevents a software crash when a program has a failure that would typically crash the software. This mechanism involves analyzing the failure in an operation, accumulating the failure information, clearing the failure (hence preventing the immediate crash), and not performing the desired operation until the root cause of the failure is fixed. Other software operations are not impacted. This mechanism will be employed to avoid database crashes when there is a failure to recover a database transaction due to reasons like data or memory corruption. A concept of transaction quarantine is introduced that isolates a dead transaction whose recovery had failed such that the recovery of this transaction can be postponed until the root cause of the failure is fixed. No database crash occurs when the transaction is quarantined, and other database transactions can continue executing.

Figure 1A:
FIGS. 1A-E provide an illustration of the problem that may occur when a recovery failure exists in a database system.

FIGS. 1A-E provide an illustration of the problem that may occur when a recovery failure exists in a database system. FIG. 1A shows a database server 142 that manages a database 140. One or more database applications (not shown) can be operated upon by one or more users/clients within the system to implement a transaction. One or more users/clients may operate a user station to issue commands to be processed by the database system upon one or more database tables. The user stations and/or the servers that host the database comprises any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the database system, such as a mouse or keyboard to manipulate a pointing object in a graphical user interface to generate user inputs. The database system is communicatively coupled to a storage device that may hold the database 140. The storage device comprises any storage device that may be employed by the database system to hold storage content. The storage device may be implemented as any suitable type of storage that can hold storage content, such as e.g., a hard disk drive (HDD) or a solid disk drive (SSD). The storage device can be implemented using any suitable architecture or form factor according to embodiments of the invention, e.g., as direct attached storage, NAS (networked attached storage), or as a cloud-based storage service.

Users and/or any database applications operated by the user may interact with the database system by submitting commands that cause the database server to perform operations on data stored in a database. For the database server to process the commands, the commands typically conform to a database language supported by the database server. An example of a commonly used database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

Write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability.

In one approach, the modifications are recorded as change records, which may be referred to herein as "redo" records. The change records are generated in-memory by a process executing a transaction, and are copied into one or more in-memory change log buffers. Multiple processes executing transactions may concurrently generate the change records into corresponding change log buffers. One or more writer processes gather the change records from the in-memory change log buffers and write them out to a persistent log file on disk. The change records are cleared from the in-memory change log buffers after they are written to persistent storage. When a writer process gathers change records from a particular region of an in-memory change log buffer, it needs to wait for and synchronize with activity from any process that is writing into the same region.

When a transaction commits, because write-ahead logging requires the change records to be persisted before applying the corresponding changes to the database, the writer process must write any remaining change records for the transaction from the corresponding in-memory change log buffer to the persistent log file. A commit change record is also generated to indicate the end of the transaction.

During the commit procedure, the process executing the transaction needs to wait for a writer process to gather and write the corresponding commit change record to the persistent log file. The process executing the transaction must also wait for the writer process to gather and write other change records for the transaction. If the transaction depends on other transactions, the writer process must also gather and write the change records of the other transactions. Furthermore, the writer process must wait for any other process that is modifying a corresponding region of the in-memory change log buffer. In addition, the commit processing must wait for the log data to be written to a persistent storage device, with a corresponding acknowledgement of the write into persistent storage, before the commit can occur. Indeed, the physical disk I/O performed by the writer process is a major time component of performing the commit operation.

In the current example of FIG. 1A, one or more transactions are operating against the database 140 using the database server 142. As shown in this figure, transaction processing is currently being performed for transaction 120a against the database 140.

Figure 1B:
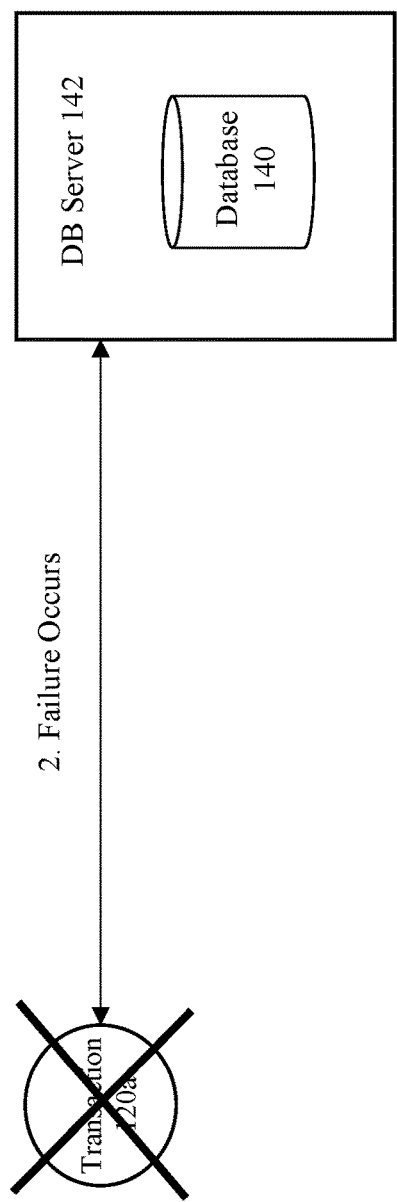

As shown in FIG. 1B, consider if a failure occurs relative to one of transactions. In the illustrated example, a failure has occurred with respect to transaction 120a.

Figure 1C:
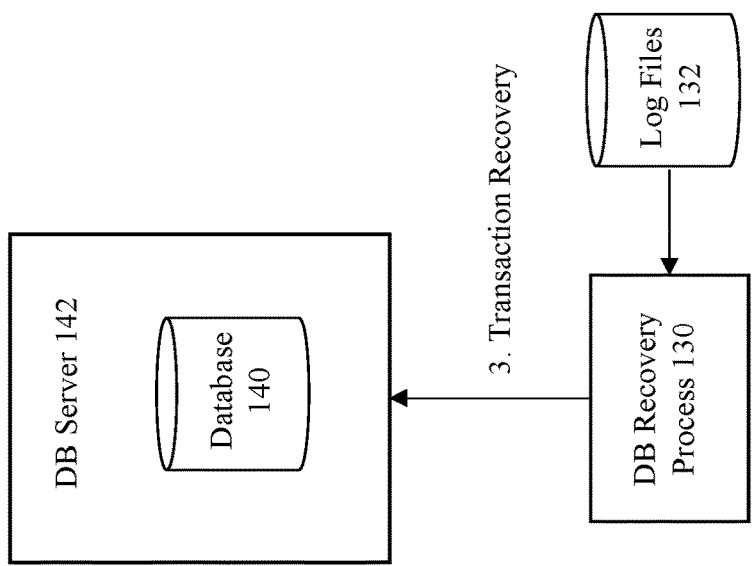

As shown in FIG. 1C, recovery processing is performed if a failure occurs prior to the commit of a transaction, since the intermediate changes made by that transaction should not be made permanent in the database unless the transaction has actually committed. The transaction recovery processing may occur, for example, after a database is re-opened following an instance or node crash to correct the state of the database.

A DB recovery process 130 may be used to restore the database to a correct and consistent state in the event of a failure so that the intermediate changes made by the transaction can be removed. The DB recovery process 130 may apply log records from log files 132 to restore the state of the database to a correct state from prior to the failure. The log records to be applied by the recovery process 130 may include redo logs and/or undo logs.

Various types of entities may be employed as a recovery process in a computing system. In the database context, a system monitor process (SMON) may be employed as a recovery process. In some systems, the SMON can be implemented as a background system process that performs instance recovery to clean up after failures and dirty shutdowns, particularly for the occurrence of an instance failure. For example, if a database instance crashes, any changes that are made in memory (e.g., in a shared global memory area (SGA)) are not written to the data files. When the instance restarts, the SMON background process automatically performs instance recovery by performing the following tasks such as rolling forward changes that are made in the online redo log files but not in the data files, since all the committed transactions are written to the online redo log files, where these are successfully recovered as result of rolling forward changes from the online redo log files to the data files. The SMON may also roll back any changes by uncommitted transactions. The SMON process may be configured to check on a regular basis whether it is needed, e.g., where SMON wakes up every 5 minutes to perform its functions. Other processes can also call SMON on an as-needed basis if they detect a need for it, e.g., to perform recovery if the failure is identified by another process. Additional processes may also be used to implement recovery. For example, the Process Monitor (PMON) is used to perform recovery, for example, upon the failure of a background process. If a background process fails, the PMON process performs the cleanup operations by performing the following tasks: (a) rolling back the user's current transaction; (b) releasing all the locks that are held on tables or rows; (c) freeing other resources used by the users; and (d) restarting any dead dispatchers.

For the sake of visual explanation, FIG. 1C shows the location of the DB recovery process 130 outside the boundaries of the DB server 142. However, it is noted that this aspect of the figure is not intended to constrain or limit the actual location of the DB recovery process 130. Indeed, in many implementations, the recovery process 130 is implemented as a process within the database system itself, e.g., where SMON and PMON are database background processes.

Figure 1D:
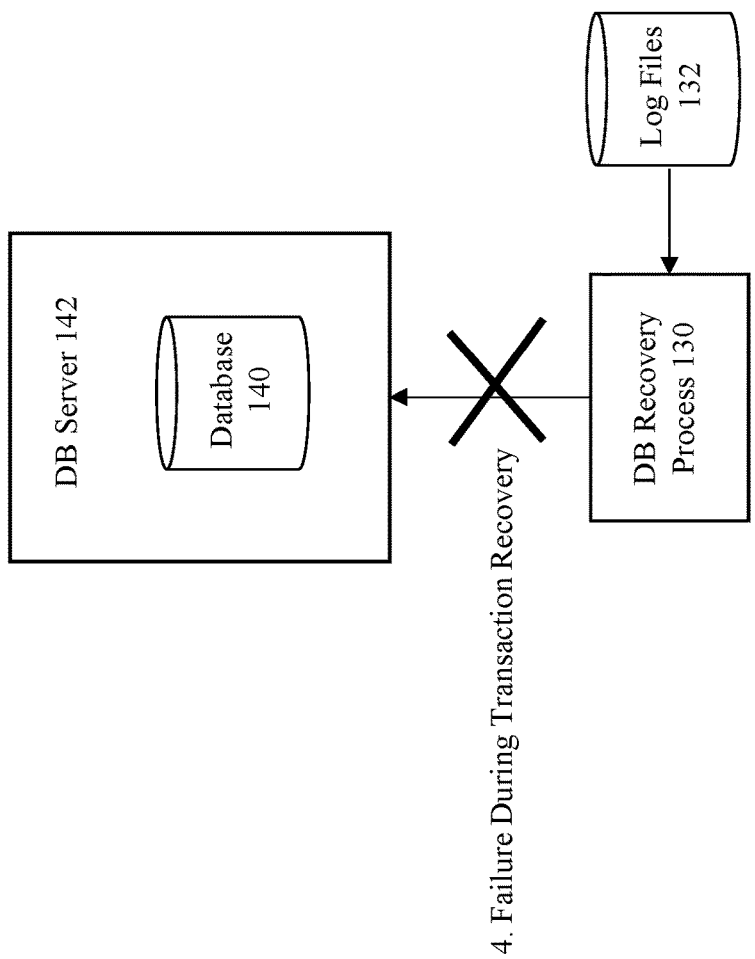

Consider the situation shown in FIG. 1D, where a failure occurs during the recovery process. This is a cascading failure situation where an original failure (the transaction failure) leads to a subsequent recovery process that itself undergoes a failure.

This situation is potentially problematic if the recovery process is in a category of processes that can be considered a "fatal process" or a "fatal background process". These types of processes are implemented such that when they crash or undergo a failure, then the database instance itself will shut down. This instance shutdown may occur in some situations because the process is so integral to the functioning of the database such that its failure will also cause the instance to fail. In addition, the database may be configured to intentionally shut down the instance upon detection of a failure for the fatal process, e.g., where the process itself or another process detects the existence of the failure, and then shuts down the instance upon the assumption that the failure situation means that the database cannot function normally anymore.

In specific context of a RDBMS, the database may shut down if a database transaction fails to recover by a fatal background process. For example, consider if the undo logs in log files 132 required by the DB recovery process 130 to implement recovery somehow becomes corrupt. In this situation, the DB recovery process 130 will be unable to perform its recovery functions. This would therefore prevent the uncommitted states of the failed transaction from being corrected in the database.

Figure 1E:
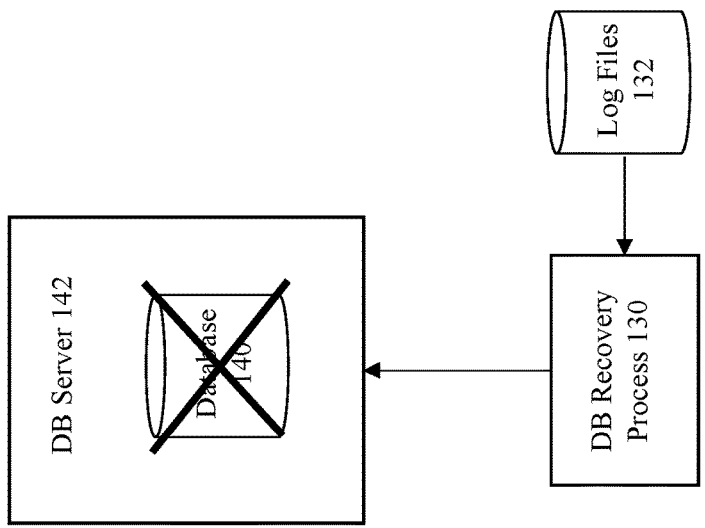

Conventionally, database systems are unable to tolerate such failures during the recovery process and would therefore cause the entire database system, or at least the affected database instance, to be shut down upon occurrence of the recovery failure. Thus, as shown in FIG. 1E, the fatal background process death during transaction recovery is a failure (failure of SMON) that can cause a crash to the database.

However, the problem with this approach is that in some circumstances, shutting down the database becomes an overly severe solution to this problem. This is because certain failures exist in the software that can be tolerated while the software keeps running and performs regular operations. These failures can be cleared until the reason of the failure is fixed. As such, the conventional approach of using a "one-size-fits-all" solution to shut down the whole database is an overly draconian action that may not be needed in many circumstances.

To address this problem, embodiments of the invention implements an approach that prevents a software crash when a program has a failure that would typically crash the software. In particular, this approach uses the concept transaction quarantine to isolate a dead transaction whose recovery had failed such that the recovery of this transaction can be postponed until the root cause of the failure is fixed. No database crash occurs when the transaction is quarantined, and other database transactions can continue executing.

Figure 2:
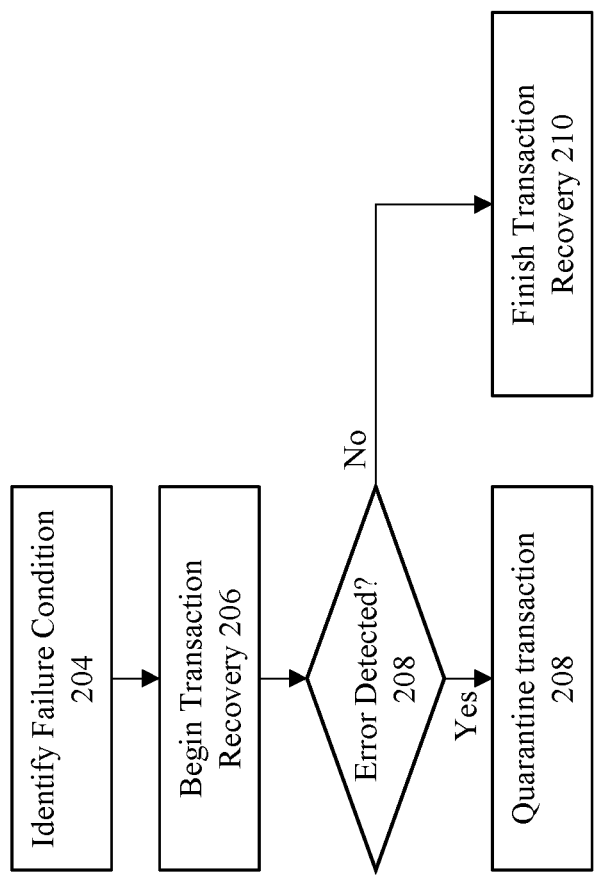
FIG. 2 shows a flowchart of an approach to implement some embodiments of the invention.

FIG. 2 shows a flowchart of an approach to implement some embodiments of the invention. Before a failure, transaction processing may be performed for one or more transactions in the database system. During the transaction processing, log records are created which record information about the changes made by the transactions during their processing. At 204, a failure condition may be identified in the database system that is pertinent to the operation of a transaction. There are numerous types of circumstances that may cause the failure of a transaction, including both hardware-related and software-related failures. Hardware-related failures may encompass situations such as network interruptions, an unexpected shutdown of a computing node, disk failure, etc. Software-related failures may include, for example, OS-related problems, unexpected instance shutdowns, software-related bugs, etc.

At 206, transaction recovery is initiated for the failed transaction(s). As previously noted, many database systems utilize redo and undo log records for data consistency. When the database is opened following a crash, the application of redo rolls forward the database to get all the committed changes (often referred to as "cache recovery") and undo rolls the changes made by uncommitted (and now dead due to the crash) transactions back. This is known as "crash recovery". In some cases, the database open does not wait for the uncommitted transactions' undo to be applied to achieve a faster startup. Instead, it marks the state of the transaction as 'dead' in the transaction table and the database is opened quickly. The application of undo for dead transactions is then performed asynchronously by a recovery process (e.g., an SMON background process) and this process is often referred to as transaction recovery. The other time when dead transactions are recovered by SMON is during "instance recovery". A database instance (e.g. in a distributed, clustered databased) can crash with actively running transactions. Those dead transactions hold rowlocks that block transactions on the same rows on the other surviving instances in a cluster (a clustered instance may be referred to herein as a "RAC instance"). In this scenario, the SMON background process on one of the surviving instances performs instance recovery in two phases, including a cache recovery phase followed by transaction recovery phase. A PMON background process can also offload the work of aborting a large transaction during dead process cleanup to SMON.

At 208, a determination is made whether an error is detected during recovery processing. If no error has occurred, then at 210, transaction recovery is performed and finished for each of the transactions that need to be recovered.

However, it is possible that a transaction recovery failure does occur. A transaction recovery failure may occur due to any number of possible reasons, including one or more reasons from the following non-limiting list of reasons: (a) data and/or index block corruptions (e.g., based upon a block check error, physical block corruption, and/or encrypted block is corrupt); (b) lost writes; (c) bugs in redo callbacks; (d) memory corruptions; and/or (e) state corruptions.

What is notable is that the recovery process may be implemented as a fatal process, where a crash of the fatal process is handled by the system by causing the database itself (or a given database instance) to shut down. For example, with certain database systems provided by Oracle Corporation, SMON is implemented as a fatal background process. What this mean is that a crash in SMON would lead to the crash of an entire database instance, either initiated by SMON itself or by another process that detects the disappearance of SMON. As such, not only does a recovery-related crash stop the recovery of the transaction that is actively being recovered by SMON, but the recovery also stops for the rest of the dead transactions (since the entire instance is now dead). Even if SMON transaction recovery is operationally disabled to avoid stoppage of the database, opening the database without running SMON could lead to other problems as well, e.g., where rowlocks are being held by dead transactions for a longer period of time, which could severely impact critical business operations.

With embodiments of the invention, at step 208, the concept of "transaction quarantine" is implemented to prevent the crash in SMON during transaction recovery. With a transaction quarantine, the dead transaction that hits an exception during recovery is not recovered until manual or automatic corrective action is taken to fix the issue causing the crash. In some embodiments of the invention, the quarantined transaction continues to hold rowlocks until fully recovered, but block-level recovery makes it feasible for new queries or DMLs (data manipulation language statements) to release rowlocks in the specific data blocks they are interested in. The quarantine information including the crash details and corrective action can be shown to the user. The user can thereafter drop the quarantine after the problem is fixed, and SMON automatically retries and completes the recovery for this transaction.

The benefit of transaction quarantining is the high availability of the database. The database stays up and running and keeps on serving SQL statements. Moreover, transaction recovery does not stop as other dead transactions can be recovered in the presence of quarantines.

Figure 3A:
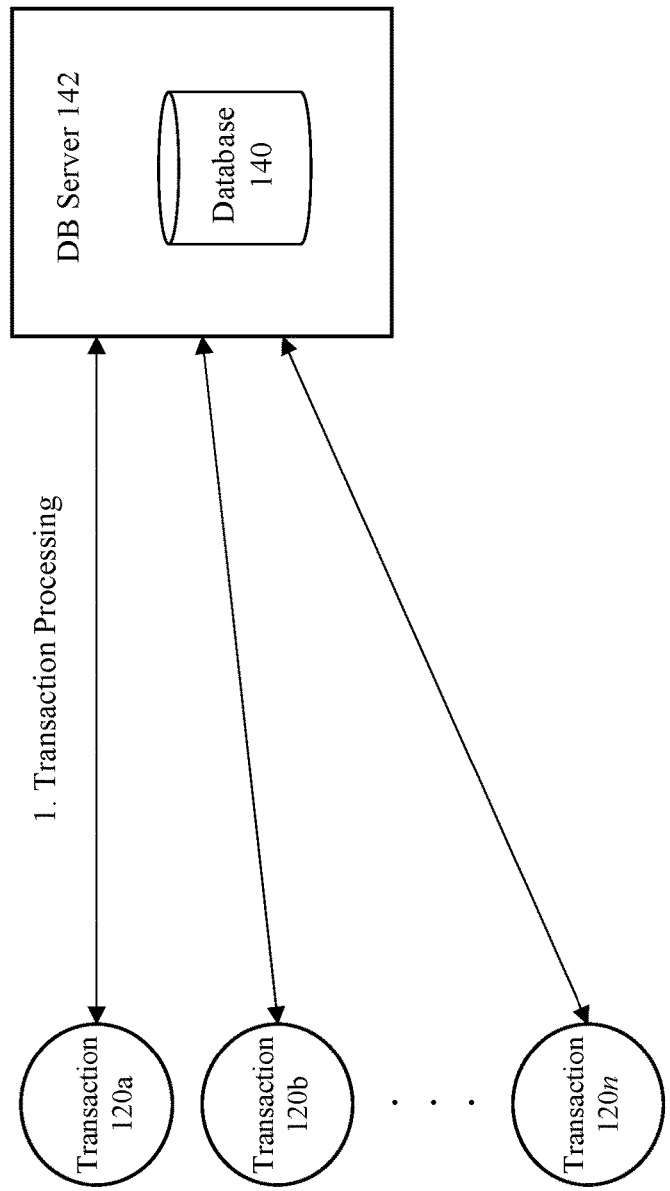
FIGS. 3A-G provide an illustration of some embodiments of the invention in operation.
Figure 3B:
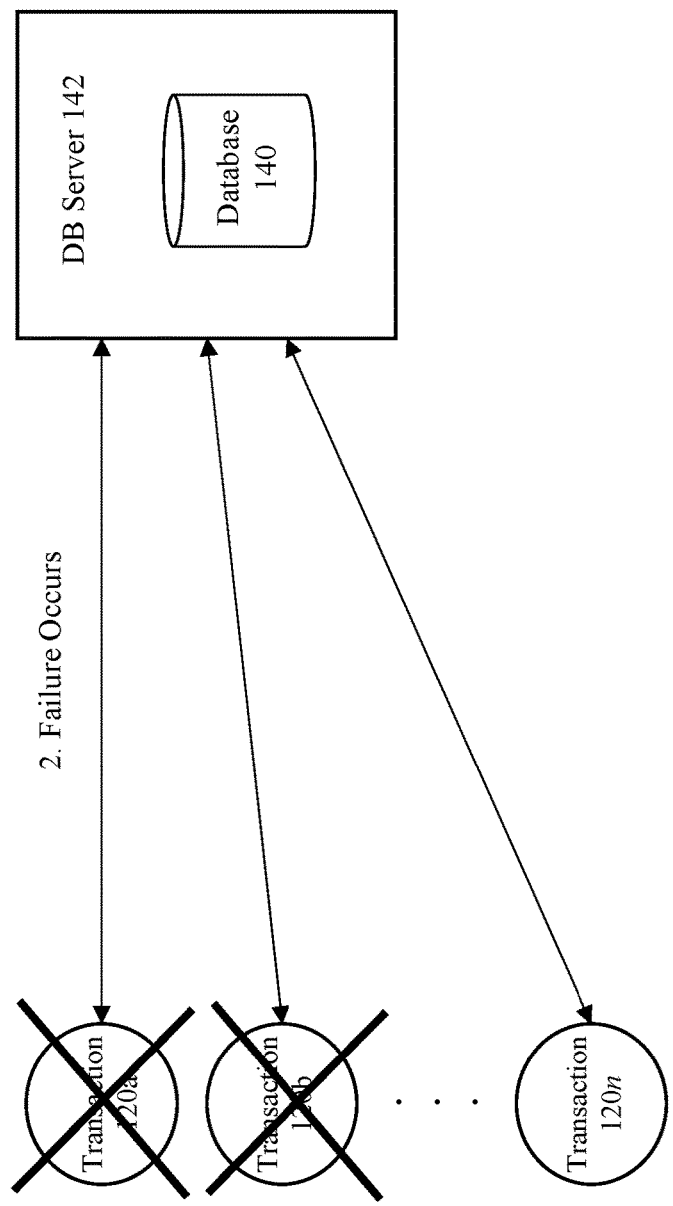
Figure 3C:
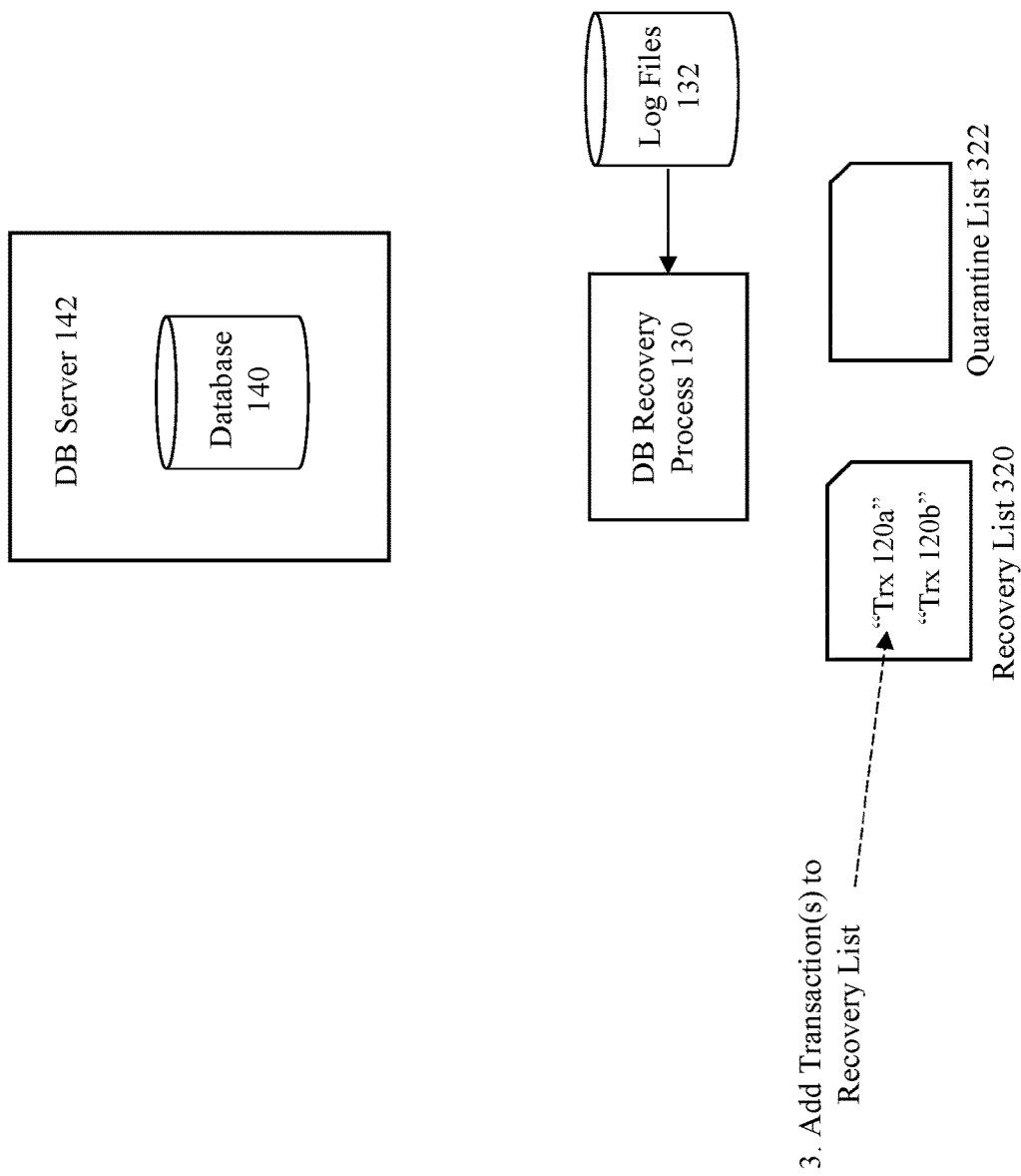

FIGS. 3A-G provide an illustration of some embodiments of the invention in operation. FIG. 3A shows a set of transactions 120a-n that interact with a database server 142 to operate against a database 140. FIG. 3B illustrates a failure that occurs relative to one or more transactions, such as transactions 120a and 120b. As shown in FIG. 3C, recovery processing is performed to recover from the failure of the failed transactions. The transaction recovery processing may occur, for example, after a database is re-opened following an instance or node crash to correct the state of the database. A DB recovery process 130 may be used to restore the database to a correct and consistent state in the event of a failure so that the intermediate changes made by the transaction can be removed. The DB recovery process 130 may apply log records from log files 132 to restore the state of the database to a correct state from prior to the failure.

The database system may mark or otherwise identify transactions that need to be recovered by the recovery process. For example, as shown in FIG. 3C, a recovery list 320 may be maintained to identify transactions that should be targeted for recovery. Any suitable approach to mark or track transactions is within the scope of embodiments of the invention to track transactions for recovery. For example, a foreground process that opens a database after a failure situation may be used to mark previously-active transactions for recovery, e.g., in a transaction table where a flag "Active" refers to active transactions and a flag "Dead" refers to a dead transaction to be recovered. The recovery process would identify such transactions that are marked in this manner or which otherwise appear on a recovery list and would operate to recover such transactions.

Figure 3D:
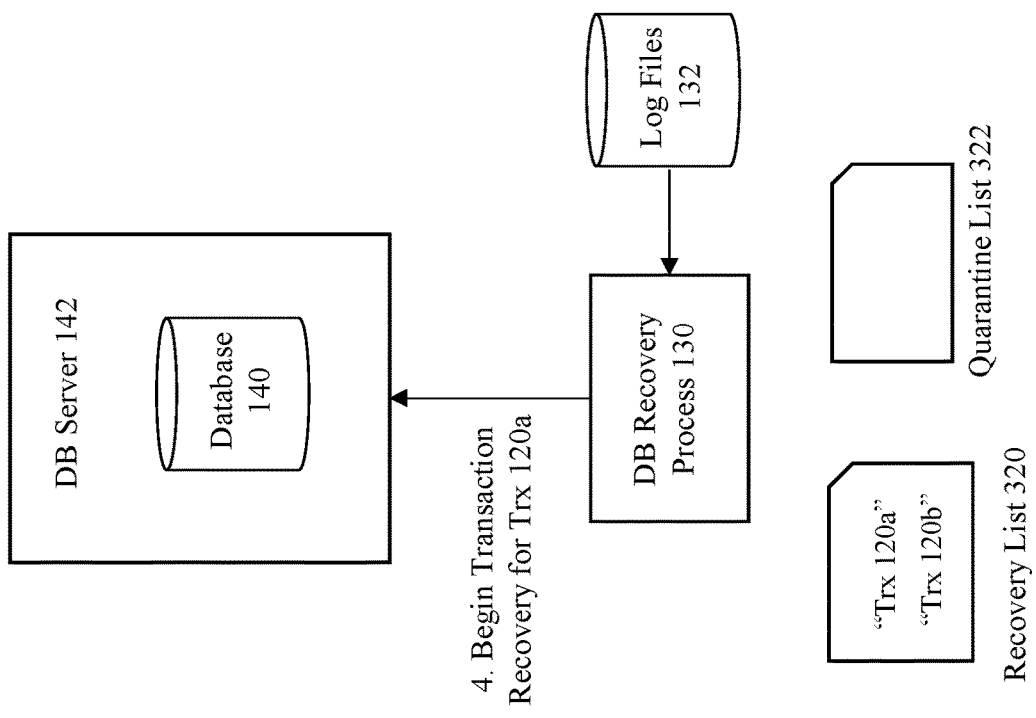
Figure 3E:
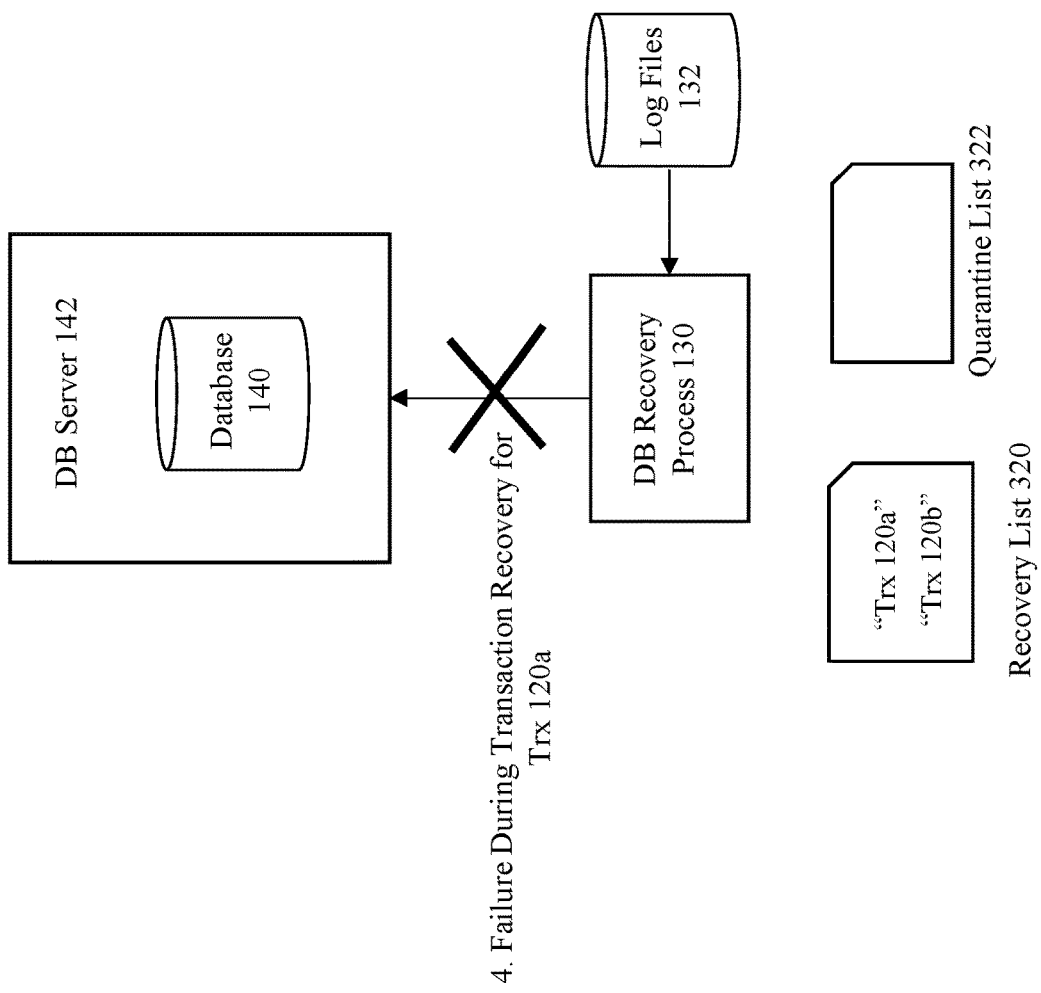

As shown in FIG. 3D, transaction recovery may be performed for the first transaction in the recovery list (e.g., Trx 120a). However, a failure may occur during recovery for a given transaction, e.g., as shown in FIG. 3E.

Figure 3F:
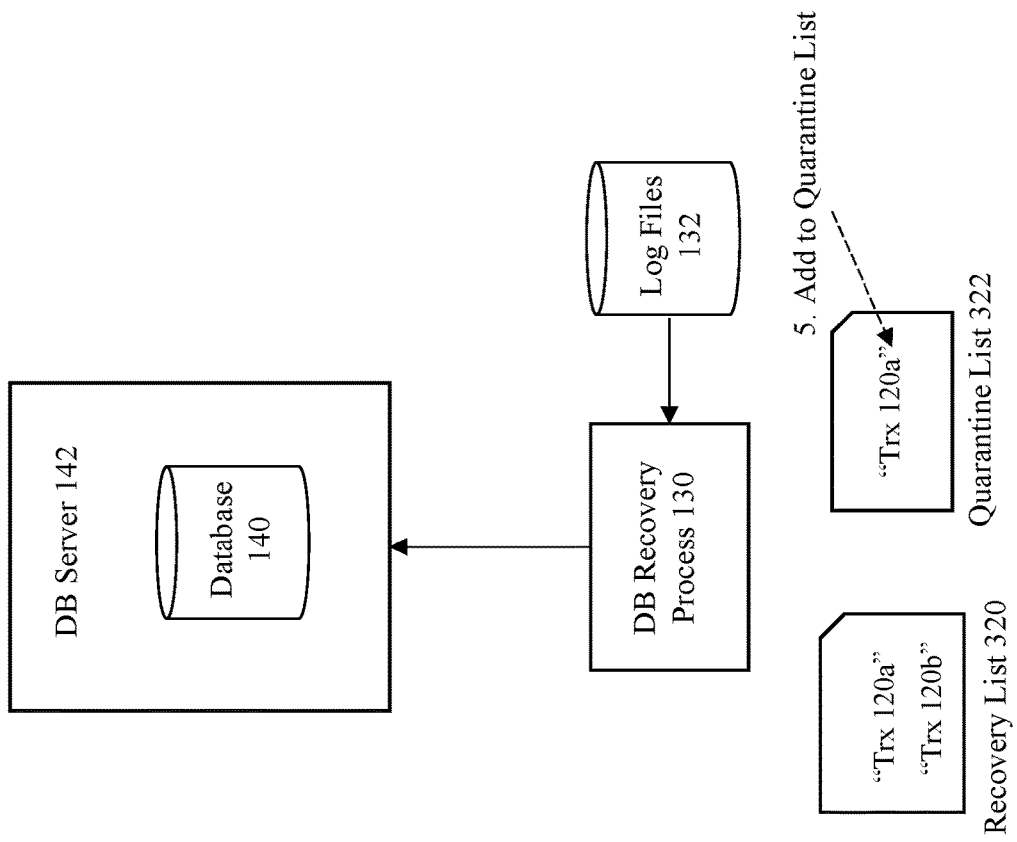

With embodiments of the invention, transaction quarantining is applied if an error occurs during recovery. A quarantine list 322 may be maintained in the system to hold a list of transactions to be quarantined. As shown in FIG. 3F, the subject transaction would be placed onto the quarantine list 322, which may be implemented as an in-memory quarantine list.

Figure 3G:
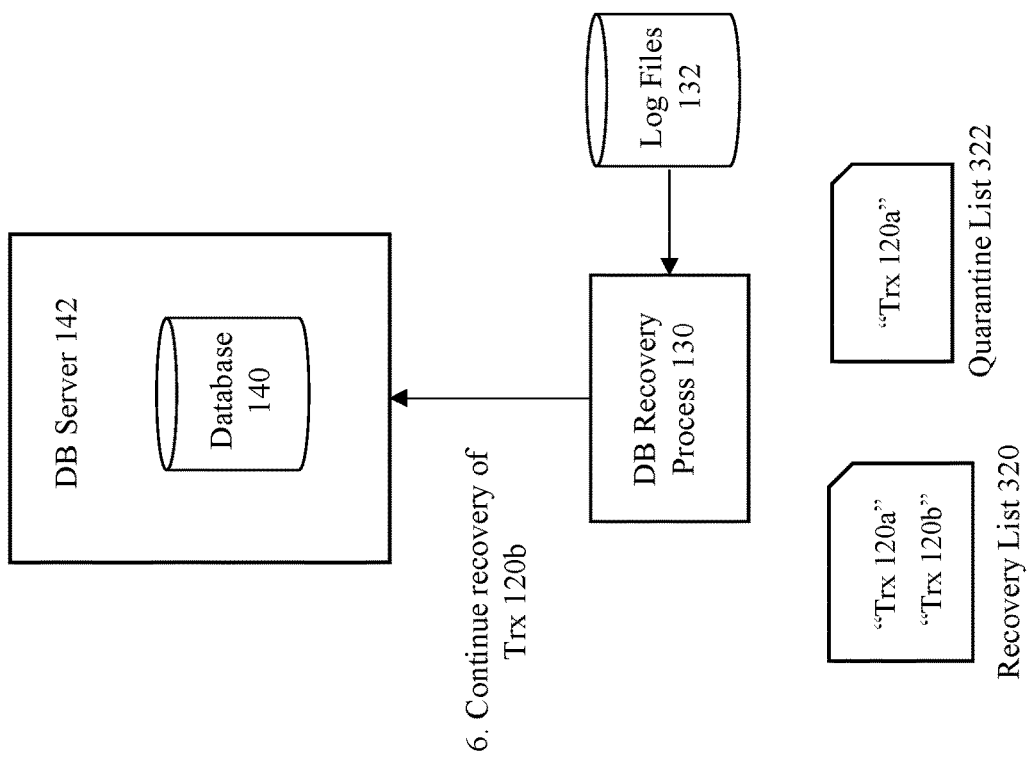

Before the current invention, if the recovery process (e.g., SMON) crashes during transaction recovery, the entire database instance may go down. To prevent that from occurring with embodiments of the invention, internal and fatal exceptions during transaction recovery are caught and cleared, and the dead transaction that failed to recover is inserted into the quarantine list 322. As shown in FIG. 3G, the SMON process would then proceed with recovery of the rest of the dead transactions from the recovery list 320. During its next periodic transaction recovery cycle, SMON skips the quarantined transactions by looking at the quarantine list and does not crash.

Figure 4A:
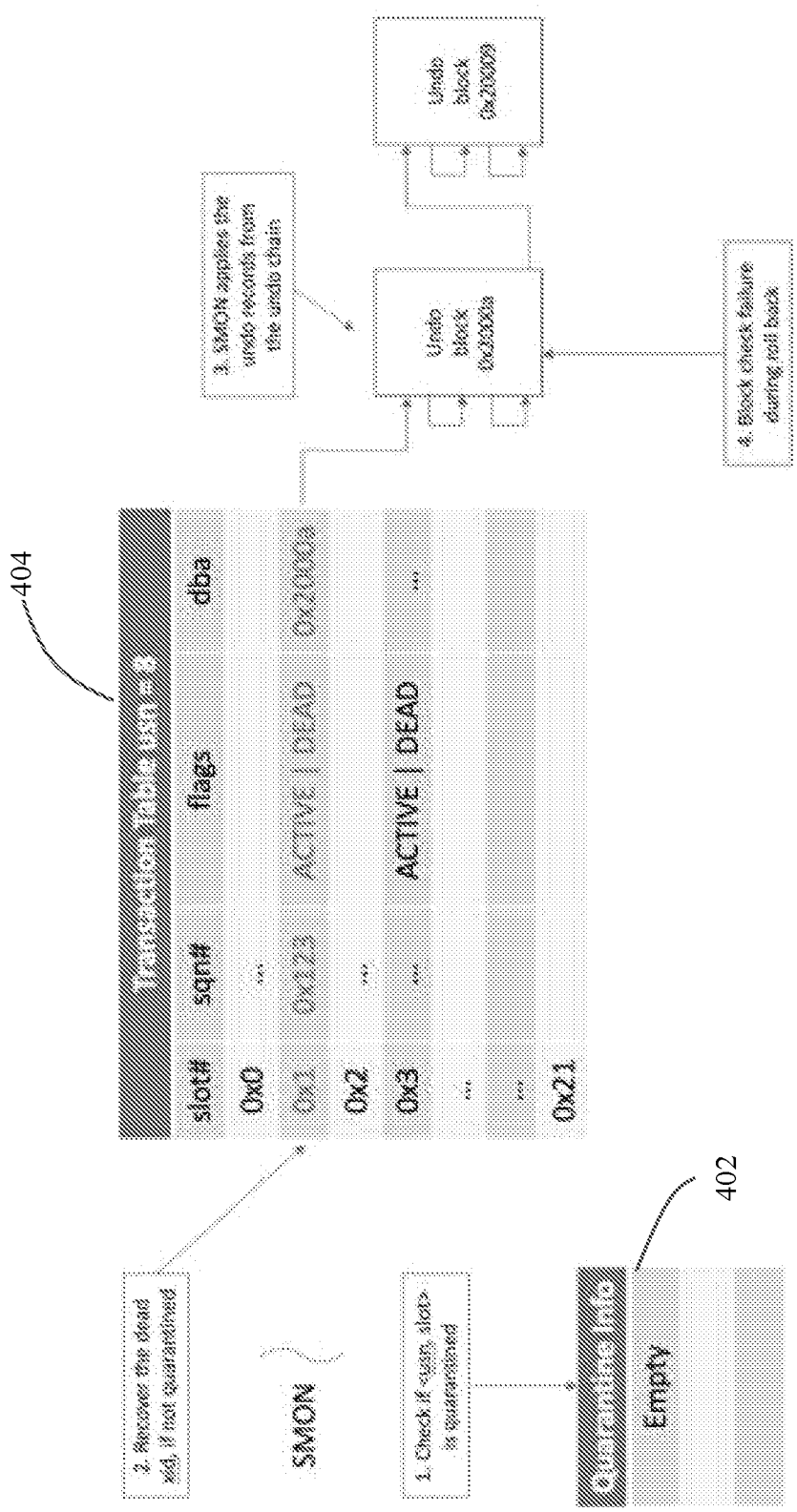
FIGS. 4A-B are diagrams that show failure handling and quarantining during transaction recovery.

FIG. 4A provides a diagram showing how SMON handles a failure and quarantine during dead transaction recovery. This is an example of a "block check" failure that may occur during transaction recovery. At stage (1), a check is made of the quarantine list 402 to see if the dead transaction to be processed has been identified as a quarantined transaction. Here, the quarantine list 402 is empty, and therefore the dead transaction has not been identified as being quarantined. Next, at stage (2), transaction recovery is started for a transaction that is identified from the transaction table 404. At stage (3), to implement the transaction recovery, SMON applies undo records against the data in the database table(s) that were affected by the dead transaction. However, at stage (4), an error has been identified for the recovery process. In particular, a block check error may be identified during the roll back processing.

Figure 4B:
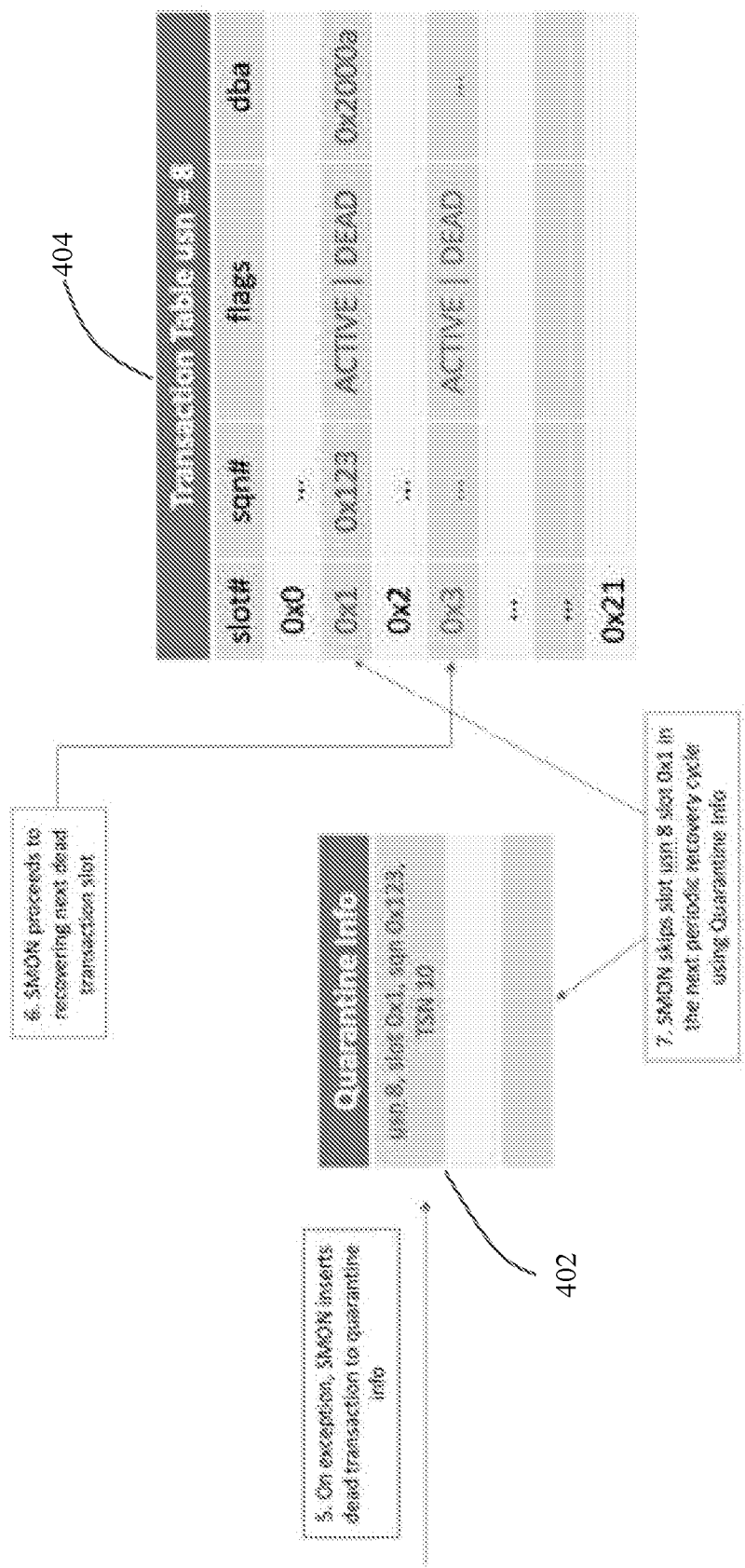

At this point, a transaction quarantine may be applied to the subject transaction. As shown in FIG. 4B at stage (5), on an exception, SMON inserts the dead transaction into the quarantine list 402, which now includes an entry that corresponds to the transaction which was being recovered when the recovery error occurred. At stage (6) SMON then proceeds to recover the next dead transaction identified in the transaction table 404. At stage (7), SMON will skip the quarantined transaction during a next subsequent recovery cycle.

Figure 5:
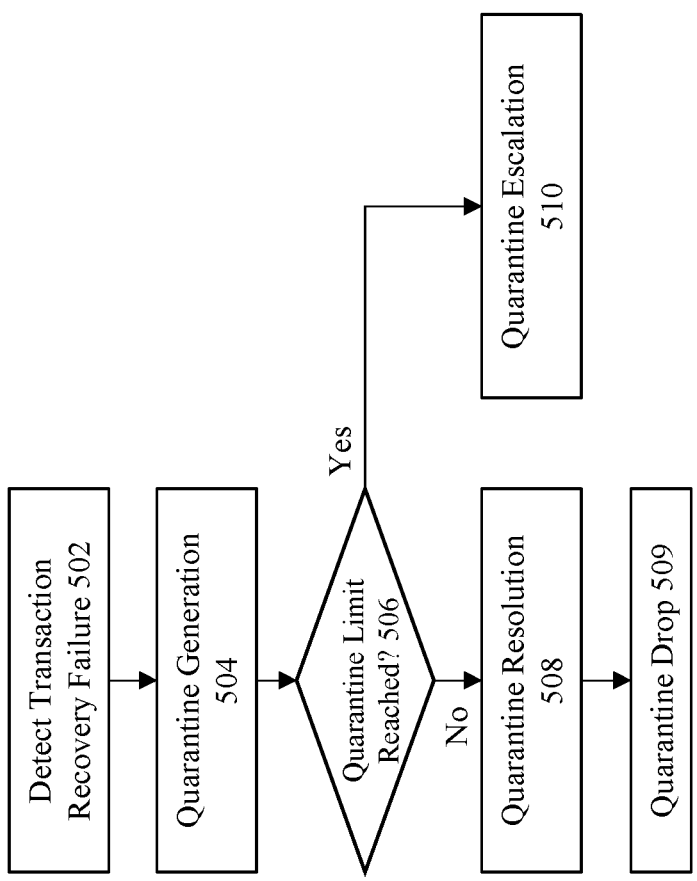
FIG. 5 shows a more detailed flowchart of actions taken to implement some embodiments of the invention.

FIG. 5 shows a more detailed flowchart of actions taken to implement some embodiments of the invention. At step 502, a transaction recovery failure is detected, e.g., from a transaction recovery process within a database system. In such systems, exception handlers may be implemented to address any error or failure situations. With some embodiments of the invention, those exception handlers will now include functionality to handle exceptions that occur when a recovery routine hits an internal or fatal exception, where quarantine processing is performed, e.g., by clearing such exceptions and to insert into a quarantine list.

At step 504, quarantine generation is performed for a transaction that is the subject of a recovery failure. In particular, a kernel-based transaction quarantine mechanism may be employed to provide an interface to process quarantines, e.g., to insert quarantine information into an in-memory list of quarantines. A non-limiting list of possible functionality that may be performed to implement the quarantine includes, for example: (a) insert, drop, query quarantines; (b) quarantine escalation (described in more detail below); (c) hold new DDL (data definition language) and view callback changes; and/or (d) perform alerting, e.g., to alert data structures or logs.

At 506, a determination can be made whether a quarantine limit is reached. The reason for making this type of check at this step is because recovery failures can occur at differing levels, such as the span of single transaction, multiple transactions, or an entire database. Failures that occur across multiple transactions or an entire database may exist due to issues such as logical data corruption due to a code bug, physical corruption of multiple blocks, or shared memory area corruption. When failures are happening across multiple transactions or that span the entire database, then quarantining just the failed dead transaction recovery may not necessarily provide any meaningful or significant benefits. This is because the exact root cause for those failures as being the same or not across the multiple transactions will determine whether quarantining of individual transactions will provide a benefit, since recovering other dead transactions might run into the same issue. If this is the case, then the system may keep encountering an inconsistent state even after quarantining a few transactions. This can be particularly dangerous when the failure is due to logical data corruption, and this logical corruption spreads over time.

To prevent this from happening, the current embodiment introduces a transaction quarantine limit, which is a parameter associated with a count of the number of transactions for which a quarantine is imposed due to recovery error. If the quarantine limit is reached, then at step 510, the quarantine process is escalated to a higher level of granularity. For example, a shutdown may be imposed at the database level and/or at the level of the database instance. This escalation approach is employed since in many circumstances, it is better to crash the database than to keep it running with a persistent bug that can corrupt even more customer data. In some embodiments, the quarantine limit is a configurable parameter, which may be associated with a default value (e.g., a default value of "3").

If it is determined at step 506 that the quarantine limit has not been reached, then the default transaction-level quarantine is maintained. This is because transaction quarantine is of great benefit in cases when the failure (memory, data, or state corruption) is confined to a single transaction. In this situation, the dead transaction that fails to recover is quarantined, and the system will continue allowing other dead transactions to be recovered.

At step 508, one or more acts of quarantine resolution may be performed in the database system. The resolution actions may be performed manually by a DBA (database administrator) or automatically by the database system using an automated resolution mechanism (e.g., having a rulebase/rules engine or based upon a machine learning engine). Depending on the reason for the failure, the quarantine resolution may perform one or a few of the following operations: (a) block media recovery; (b) segment repair, e.g., truncate or drop and recover the segment (table, index) from other sources; (c) corrupt and drop the rollback segment (e.g., by using offline rolling segments; and/or (d) perform a point in time recovery (PITR), e.g., with table PITR, tablespace PITR, database PITR, or a database flashback. For physical corruptions, the block media recovery approach is particularly useful when applied to physical block corruptions caused by issues such as media failures. For logical corruptions, an entire sequence of the actions from (a) through (d) may be applied in this order to resolve the logical corruption, where if one technique does not work, then the next technique is attempted until a successful resolution is reached.

At 509, after quarantine resolution has succeeded, then the quarantine can be dropped. It is noted that SMON should not retry transaction recovery until the root cause of the failure has been fixed since repeated exceptions may cause the process to crash. Therefore, after the quarantine has been resolved by taking the appropriate corrective action, and if the quarantine still shows up in the undo segment, then the quarantined transaction should be dropped for SMON to complete transaction recovery of the quarantine.

This approach therefore makes the transaction recovery process resistant to crashes that may occur relative to the processing and/or to any associated fatal process entities. In particular, this means that a failure in the transaction recovery will not immediately cause a crash of a database or database instance that is reliant upon a failed, fatal recovery process. Instead, the failed transaction can be added to a quarantine list and skipped during recovery processing. The transaction recovery can then proceed for other dead transactions even if one transaction fails to recover. If any terminated transactions were skipped during instance recovery, then SMON recovers them when the tablespace or file is brought back online. This allows the system and/or DBA with the ability to address the specific recovery failure during transaction recovery, while keeping the rest of the system running normally.

For recovery of the non-quarantined transactions, this can proceed even if additional steps need to be taken to address the existence of (and effects of) quarantined transactions that have not yet been recovered. For example, Block Level transaction Recovery (BLR) can be applied to address changes made by the quarantined transactions. BLR is a block recovery approach that is performed by a foreground process to access rows modified by a dead transaction, where the foreground process performs transaction recovery on the block of interest. With this approach, database activities (e.g., DML operations) are not blocked based on the quarantined transaction because the BLR functionality may be applied to restore individual affected blocks. Therefore, if a transaction is quarantined, other transactions can recover the data blocks they are interested in using BLR and make progress. However, it is noted that if the data or undo block is too corrupt to be addressed in this manner, then the BLR process may fail and cause this additional activity to end.

One context in which the approach of implementing a quarantine is particularly useful is in the context of a multi-tenant database. For example, the invention may be applied to a computing architecture that implements a multi-tenant database as a container database (CDB) system. A CDB consolidates multiple pluggable databases (PDB), and implements a portable collection of schemas, schema objects, and non-schema objects. With this architecture, a base infrastructure is provided by the CDB as a platform to implement and host individual private databases. The private databases themselves would then be "plugged" into the CDB as individual databases for a tenant embodied as the PDBs.

With some embodiments of the invention, the quarantine functionality will isolate the impact of corruption and bugs on an individual PDB. If there are several quarantined transactions, it signals a state inconsistency and the affected PDB is force closed. This would impose a specific type of quarantine escalation as identified in FIG. 5.

Figure 6:
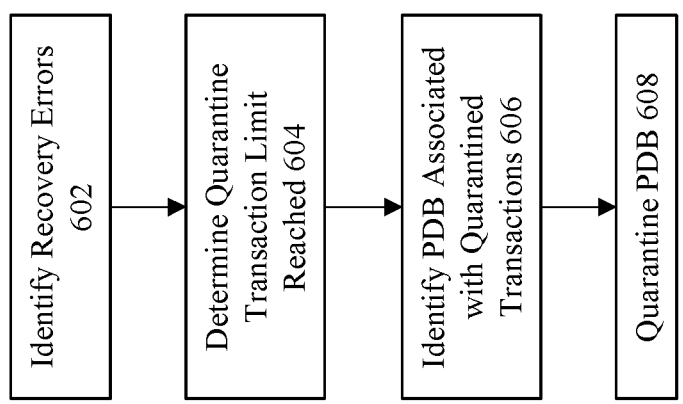
FIG. 6 shows a flowchart of an embodiment of PDB quarantining.

FIG. 6 shows a flowchart of an embodiment of this approach. At step 602, one or more recovery error are identified in a multi-tenant database system. At 604, a determination may be made that a limit has been reached for a transaction quarantine limit. This determination is made to try and isolate the impact of corruption and bugs on an individual PDB. This is because if there are several quarantined transactions, then this situation may signal a state inconsistency that is overly extensive within the entire PDB itself. For example, the failures may relate to error conditions that span the entire PDB, such as physical corruption of multiple blocks or PDB SGA corruption.

At this point, quarantine escalation may be performed. For this particular embodiment, the quarantine escalation is applied to quarantine an entire PDB. Therefore, the specific PDB is identified that is associated with the failed transactions.

Thereafter, at step 608, the PDB is quarantined. The PDB is quarantined to prevent, for example, any logical corruptions from spreading too widely. Another benefit of this approach is that it may avoid the crash of the entire CDB instance, since the persistent failures or unrecoverable errors will hopefully be isolated within a single PDB (or smaller number of PDBs) rather than spreading to infect the whole CDB.

Figure 7A:
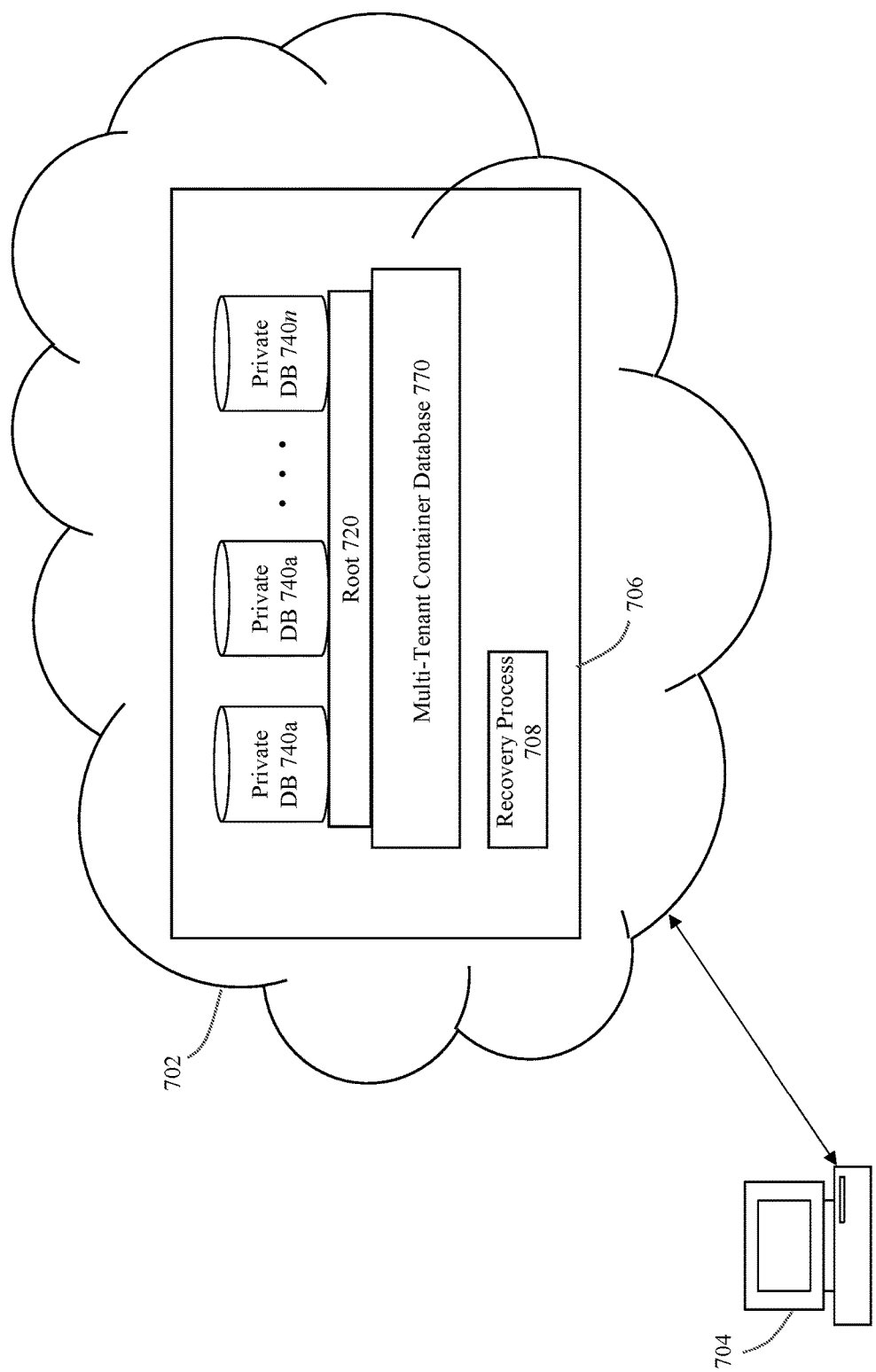
FIGS. 7A-B provide an illustrative example of an approach to quarantine a PDB.
Figure 7B:
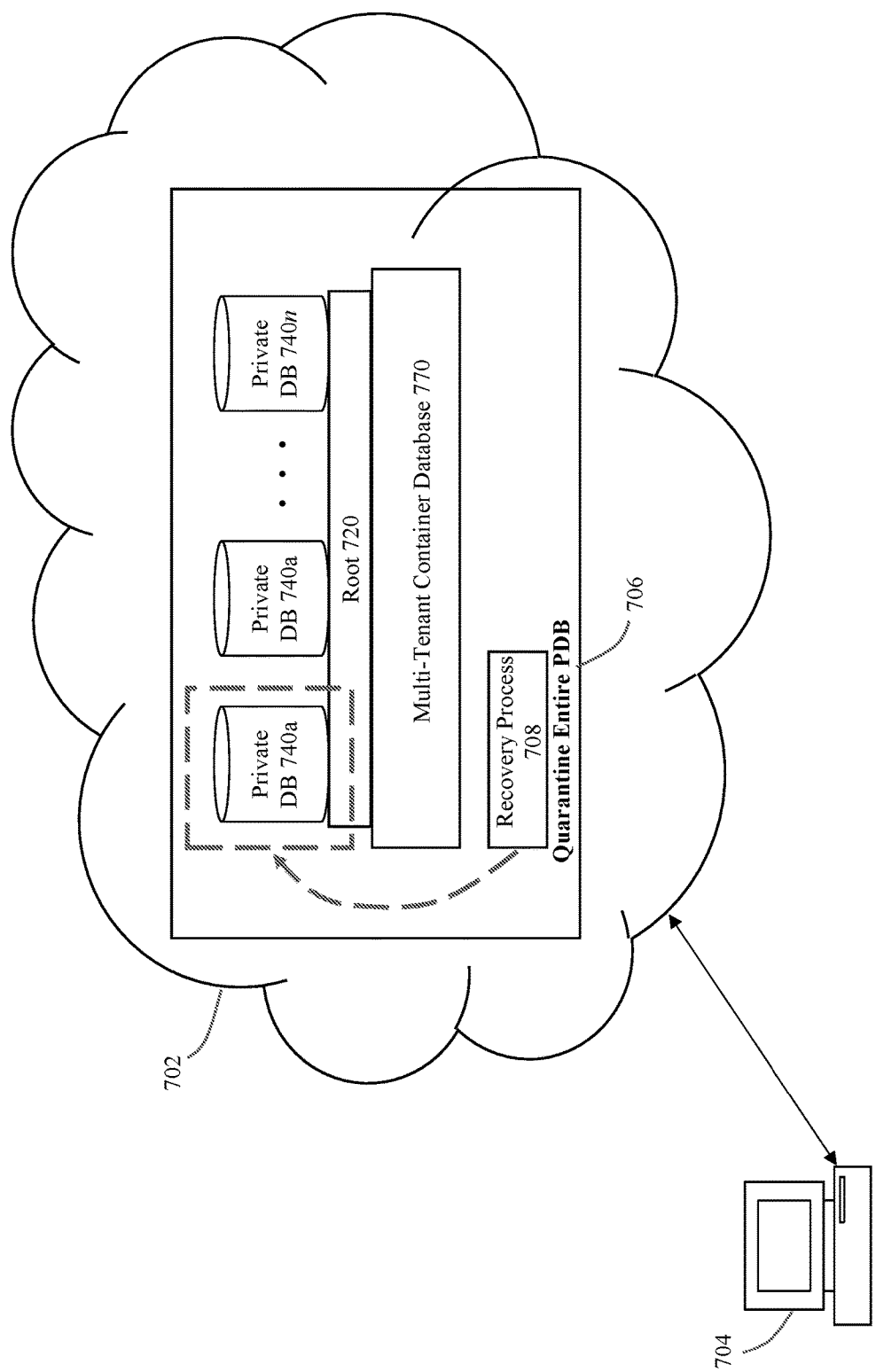

FIGS. 7A-B provide an illustrative example of this approach to quarantine a PDB. In one example implementation of an architecture to implement CBDs and PDBs, a container can be implemented as either a PDB or root, where the root container is a collection of schemas, schema objects, and nonschema objects to which the PDBs belong.

As shown in FIG. 7A, the CDB 770 includes a root 720, which stores metadata and common users. The CDB 770 may also include a seed PDB, which is a system-supplied template that the CDB can use to create new PDBs. One or more user-created PDBs 740*a-n* may also exist in the CDB 770 (or be "plugged" into the CDB 770), where a PDB corresponds to a user-created entity that contains the data and code required for a specific set of features. For example, a PDB can support a specific application, such as a human resources or sales application. The multi-tenant instance may be implemented, for example, as a virtual machine that instantiates multiple tenant databases (CDB).

The advantage of this approach for a multi-tenant database is with regards to resource usage and database consolidation. Database consolidation is the process of consolidating data from multiple databases into one database on one computer. Using the multi-tenant architecture for database consolidation provides benefits for cost reduction, since by consolidating hardware and database infrastructure to a single set of background processes, and efficiently sharing computational and memory resources, this reduces costs for hardware and maintenance tasks/expenses. This also provides advantages for easier management and monitoring of the physical database, as well as efficiencies for performance tuning.

This multi-tenant approach is particularly beneficial in a cloud-based computing environment 702 that is accessible by a user station 704. In a cloud computing environment 702, computing systems 706 may be provided as a service to customers. One of the main reasons for the rising popularity of cloud computing is that the cloud computing model typically allows customers to avoid or minimize both the upfront costs and ongoing costs that are associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time. The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

Assume that the processing of FIG. 6 has been performed and a quarantine limit has been reached or exceeded. What this means is that multiple failures has already occurred for transactions operated upon within one of the PDBs 740a-n in FIG. 7A, and that subsequent failures have also occurred for multiple transactions by the recovery process 708.

For example, assume that the recovery failures are related to transactions associated with PDB 740a. In this case, if the quarantine limit has been reached, then quarantine escalation is performed to extend the scope of the quarantine to the entire PDB. As shown in FIG. 7B, what this means is that the entire PDB 740a is now under a recovery quarantine state. The PDB 740a is quarantined to prevent any logical corruptions that may exist in PDB 740a from spreading across to any of the other PDBs 740b-n.

Various resolution actions may then be taken to resolve the failures in the PDB context, in addition to or instead of resolution procedures outlined above specifically for transactions. For example, consider if a PDB is cloned from a source CDB when there is a pending quarantine. In this situation, the undo tablespace including all undo segments (transaction tables) and its dead transactions will be copied over to the new PDB in the target CDB. When the new PDB is opened and the undo tablespace/segments are online on the target, the recovery of dead transactions will be retried by SMON, and a quarantine may be generated if the same issue persists.

Therefore, what has been described is an improved approach to handle recovery failures associated with fatal recovery processes, where some embodiments prevent a software crash when a program has a failure that would typically crash the software.

System Architecture

Figure 8:
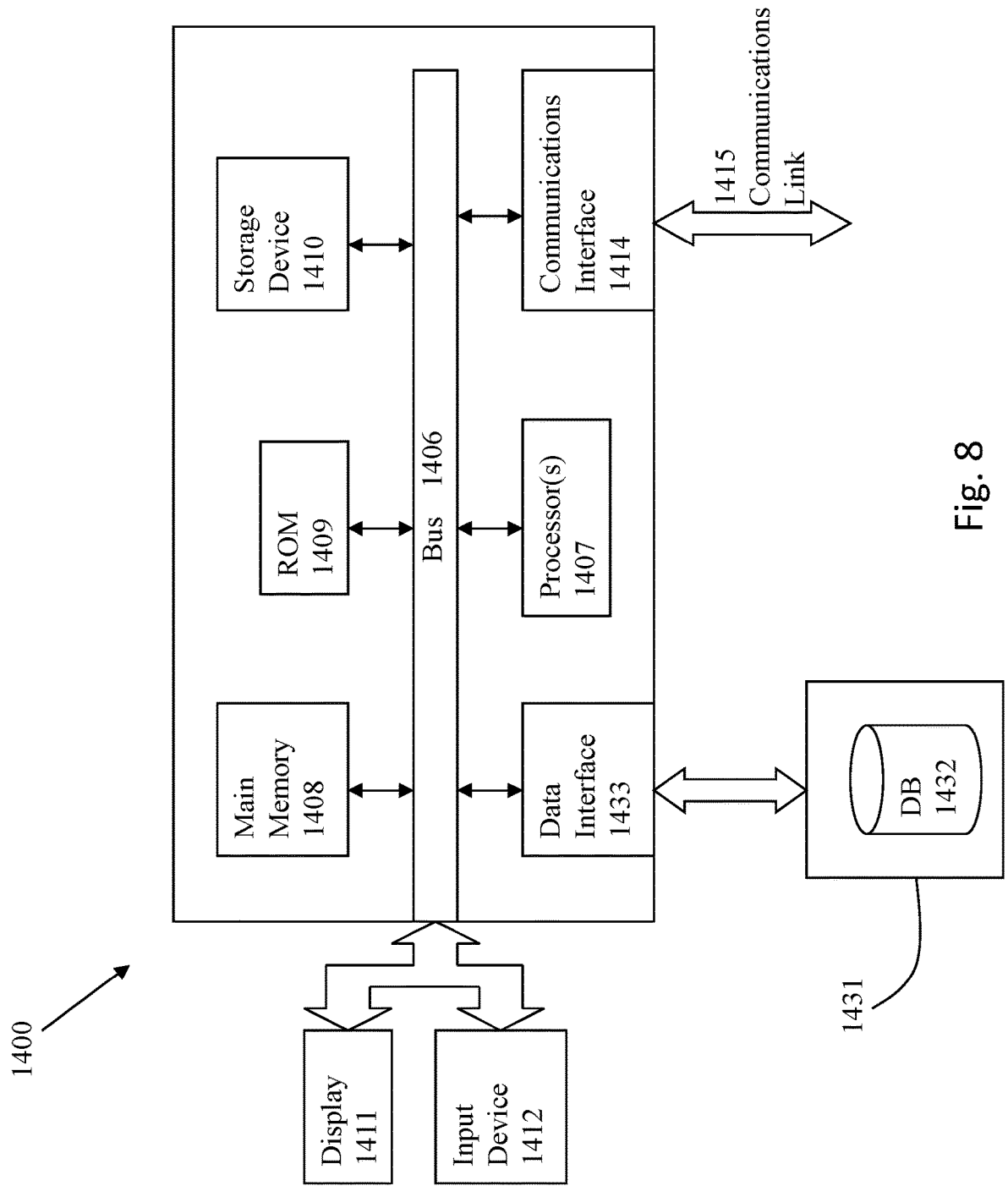
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 9:
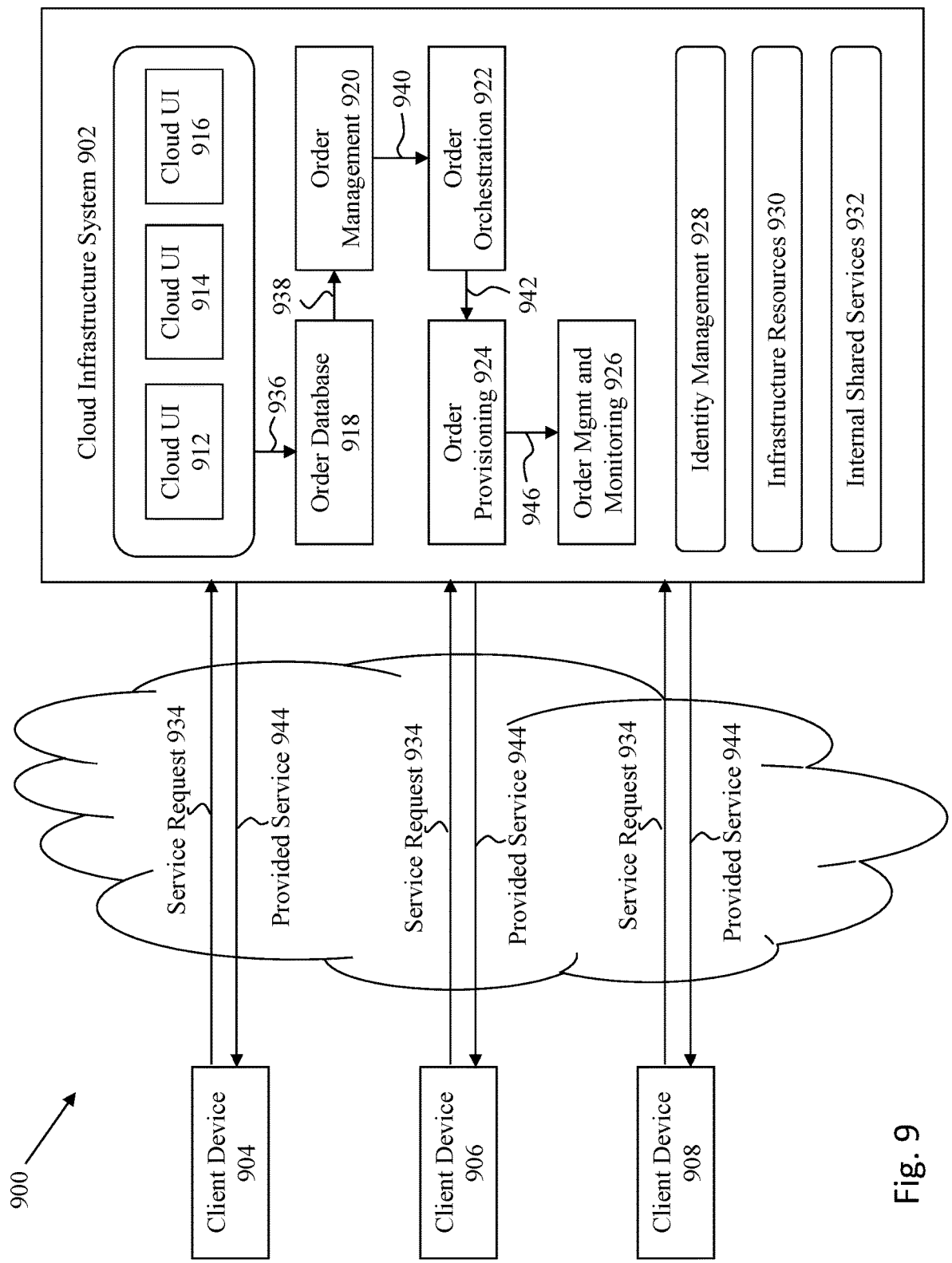
FIG. 9 is a block diagram of one or more components of a system environment in which services may be offered as cloud services, in accordance with an embodiment of the present invention.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application, or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above. Although system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols. Cloud infrastructure system 902 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by
the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916. At operation 936, the order is stored in order database 918. Order database 918 can be one of several databases operated by cloud infrastructure system 918 and operated in conjunction with other system elements. At operation 938, the order information is forwarded to an order management module 920. In some instances, order management module 920 may be configured to perform billing and accounting functions related to the order, such as verifying the order, and upon verification, booking the order. At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between
the cloud services provided by cloud infrastructure system 902 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 902 may include an identity management module 928. Identity management module 928 may be configured to provide identity services, such as access management and authorization services in cloud infrastructure system 902. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
identifying a transaction that operates against a database instance and is associated with a failure situation;
responsive to identifying the transaction that has failed, performing transaction recovery upon the transaction with a recovery process;
during the transaction recovery, encountering a recovery failure during the transaction recovery; and
responsive to both identifying the transaction that has failed and encountering the recovery failure, quarantining the transaction from the transaction recovery at least by isolating one or more transaction operations from the transaction recovery based at least in part upon the recovery failure being encountered for the transaction.

2. The method of claim 1, wherein quarantining the transaction causes the recovery process to skip the transaction when performing the transaction recovery so that the transaction recovery is performed on one or more other transactions instead of the transaction that is quarantined, and that an uncommitted state of the transaction is prevented from being corrected in the database instance.

3. The method of claim 1, wherein a quarantine limit is configured, and exceeding the quarantine limit causes an escalation of quarantine to encompass a scope greater than an individual transaction.

4. The method of claim 3, wherein the scope of the quarantine is escalated to an entire database or the database instance.

5. The method of claim 3, wherein the transaction is performed in a multi-tenant database having multiple private databases, and the scope of the quarantine is escalated to one or more private databases of the multiple private databases.

6. The method of claim 1, wherein a second transaction performs one or more database operations on a block affected by the transaction that is quarantined, where the one or more database operations by the second transaction on the block are not prevented since block level recovery is applied to the block.

7. The method of claim 1, wherein quarantine resolution is applied before releasing the transaction from quarantine, where the quarantine resolution comprises at least one of block media recovery, segment repair, or point in time recovery, quarantining the transaction prevents an uncommitted state of the transaction from being corrected in the database instance, and the failure situation is caused by an operation of a software program for executing the transaction.

8. A tangible computer program product embodied on a computer usable medium, the tangible computer readable medium having stored thereon a sequence of instructions which, when executed by a processor causes the processor to execute actions comprising:
identifying a transaction that operates against a database instance and is associated with a failure situation;
responsive to identifying the transaction that has failed, performing transaction recovery upon the transaction with a recovery process;
during the transaction recovery, encountering a recovery failure during the transaction recovery; and
responsive to both identifying the transaction that has failed and encountering the recovery failure, quarantining the transaction from the transaction recovery at least by isolating one or more transaction operations from the transaction recovery based at least in part upon the recovery failure being encountered for the transaction.

9. The computer program product of claim 8, wherein quarantining the transaction causes the recovery process to skip the transaction when performing the transaction recovery so that the transaction recovery is performed on one or more other transactions instead of the transaction that is quarantined, and that an uncommitted state of the transaction is prevented from being corrected in the database instance.

10. The computer program product of claim 8, the actions further comprise configuring a quarantine limit, and exceeding the quarantine limit causes an escalation of quarantine to encompass a scope greater than an individual transaction.

11. The computer program product of claim 10, wherein the actions further comprise escalating the scope of the quarantine to an entire database or the database instance.

12. The computer program product of claim 10, wherein the transaction is performed in a multi-tenant database having multiple private databases, and the actions further comprise escalating the scope of the quarantine to one or more private databases of the multiple private databases.

13. The computer program product of claim 8, wherein a second transaction performs one or more database operations on a block affected by the transaction that is quarantined, where the one or more database operations by the second transaction on the block are not prevented since block level recovery is applied to the block.

14. The computer program product of claim 8, wherein quarantine resolution is applied before releasing the transaction from quarantine, where the quarantine resolution comprises at least one of block media recovery, segment repair, or point in time recovery, quarantining the transaction prevents an uncommitted state of the transaction from being corrected in the database instance, and the failure situation is caused by an operation of a software program for executing the transaction.

15. A computer-based system, comprising:
a computer processor to execute a set of program code instructions;
a memory to hold the program code instructions, in which the program code instructions comprises program code which, when executed by the computer processor, causes the computer processor to perform a set of acts, the set of acts comprising:
identifying a transaction that operates against a database instance and is associated with a failure situation;
responsive to identifying the transaction that has failed, performing transaction recovery upon the transaction with a recovery process;
during the transaction recovery, encountering a recovery failure during the transaction recovery; and
responsive to both identifying the transaction that has failed and encountering the recovery failure, quarantining the transaction from the transaction recovery at least by isolating one or more transaction operations from the transaction recovery based at least in part upon the recovery failure being encountered for the transaction.

16. The system of claim 15, wherein quarantining the transaction causes the recovery process to skip the transaction when performing the transaction recovery so that the transaction recovery is performed on one or more other transactions instead of the transaction that is quarantined, and that an uncommitted state of the transaction is prevented from being corrected in the database instance.

17. The system of claim 15, wherein a quarantine limit is configured, and exceeding the quarantine limit causes an escalation of quarantine to encompass a scope greater than an individual transaction.

18. The system of claim 17, wherein the scope of the quarantine is escalated to an entire database or the database instance.

19. The system of claim 17, wherein the transaction is performed in a multi-tenant database having multiple private databases, and the scope of the quarantine is escalated to one or more private databases of the multiple private databases.

20. The system of claim 15, wherein a second transaction performs one or more database operations on a block affected by the transaction that is quarantined, where the or more database operations by the second transaction on the block are not prevented since block level recovery is applied to the block.

21. The system of claim 15, wherein quarantine resolution is applied before releasing the transaction from quarantine, where the quarantine resolution comprises at least one of block media recovery, segment repair, or point in time recovery, quarantining the transaction prevents an uncommitted state of the transaction from being corrected in the database instance, and the failure situation is caused by an operation of a software program for executing the transaction.

* * * * *